US012613413B2

(12) United States Patent
Gricourt et al.

(10) Patent No.: US 12,613,413 B2
(45) Date of Patent: Apr. 28, 2026

(54) IMMERSIVE AUDIO-VISUAL HEADSET

(71) Applicant: SOCIALDREAM, Bourg de Peage (FR)

(72) Inventors: Thierry Gricourt, Bourg de Peage (FR); Mathias Allély, Gillonnay (FR); Paul Laurens, Pommier De Beaurepaire (FR)

(73) Assignee: SOCIALDREAM, Bourg de Peage (FR)

( * ) Notice: Subject to any disclaimer, the term of this patent is extended or adjusted under 35 U.S.C. 154(b) by 0 days.

(21) Appl. No.: 18/255,552

(22) PCT Filed: Dec. 2, 2021

(86) PCT No.: PCT/EP2021/084079
§ 371 (c)(1),
(2) Date: Jun. 1, 2023

(87) PCT Pub. No.: WO2022/117776
PCT Pub. Date: Jun. 9, 2022

(65) Prior Publication Data
US 2024/0094532 A1     Mar. 21, 2024

(30) Foreign Application Priority Data

Dec. 4, 2020     (FR) ...................................... 2012731

(51) Int. Cl.
G02B 27/01      (2006.01)
G06V 40/16      (2022.01)
H04N 21/2668    (2011.01)

(52) U.S. Cl.
CPC ......... *G02B 27/017* (2013.01); *G06V 40/176* (2022.01); *H04N 21/2668* (2013.01)

(58) Field of Classification Search
CPC .................................................... G02B 27/017
See application file for complete search history.

(56) References Cited

U.S. PATENT DOCUMENTS

| | | | |
|---|---|---|---|
| 9,990,008 B2 | 6/2018 | Passmore et al. | |
| 10,234,688 B2 | 3/2019 | DeBates et al. | |
| 10,657,718 B1 | 5/2020 | Miranda et al. | |
| 2017/0323485 A1 | 11/2017 | Samec et al. | |
| 2018/0303397 A1 | 10/2018 | Krupat et al. | |
| 2019/0320978 A1* | 10/2019 | Lee ........................ A61B 5/165 |

(Continued)

FOREIGN PATENT DOCUMENTS

| | | |
|---|---|---|
| EP | 3502764 A1 | 6/2019 |
| EP | 3779559 A1 | 2/2021 |

(Continued)

OTHER PUBLICATIONS

Li Pub. No. WO2018227424 A1 machine translation for convenience only (Year: 2024).*

(Continued)

*Primary Examiner* — Gustavo Polo

(57) ABSTRACT

The invention relates to an immersive device (1), characterised in that it comprises: an attachment element (10) for attaching the device to the head of a user (2), a system for broadcasting video sequences, and an observation system for capturing, broadcasting and/or recording the reactions of the user (2).

13 Claims, 3 Drawing Sheets

(56)         References Cited

U.S. PATENT DOCUMENTS

| 2020/0139077 A1 | 5/2020 | Biradar et al. |
| 2020/0233220 A1 | 7/2020 | Strongwater et al. |
| 2020/0278556 A1 | 9/2020 | Chae et al. |
| 2021/0219891 A1 | 7/2021 | Zhu et al. |

FOREIGN PATENT DOCUMENTS

| JP | 2019-537287 A | 12/2019 |
| JP | 2022-516358 A | 2/2022 |
| WO | WO2009066408 A1 | 5/2009 |
| WO | WO2017006872 A1 | 1/2017 |
| WO | WO2018227424 A1 | 12/2018 |
| WO | WO2019246576 A1 | 12/2019 |
| WO | WO2020039152 A2 | 2/2020 |
| WO | WO2020088102 A1 | 5/2020 |

OTHER PUBLICATIONS

Notice of Reasons for Rejection for Japanese Patent Application No. 2023-557490, dated Jul. 22, 2025.

* cited by examiner

[Fig. 1]
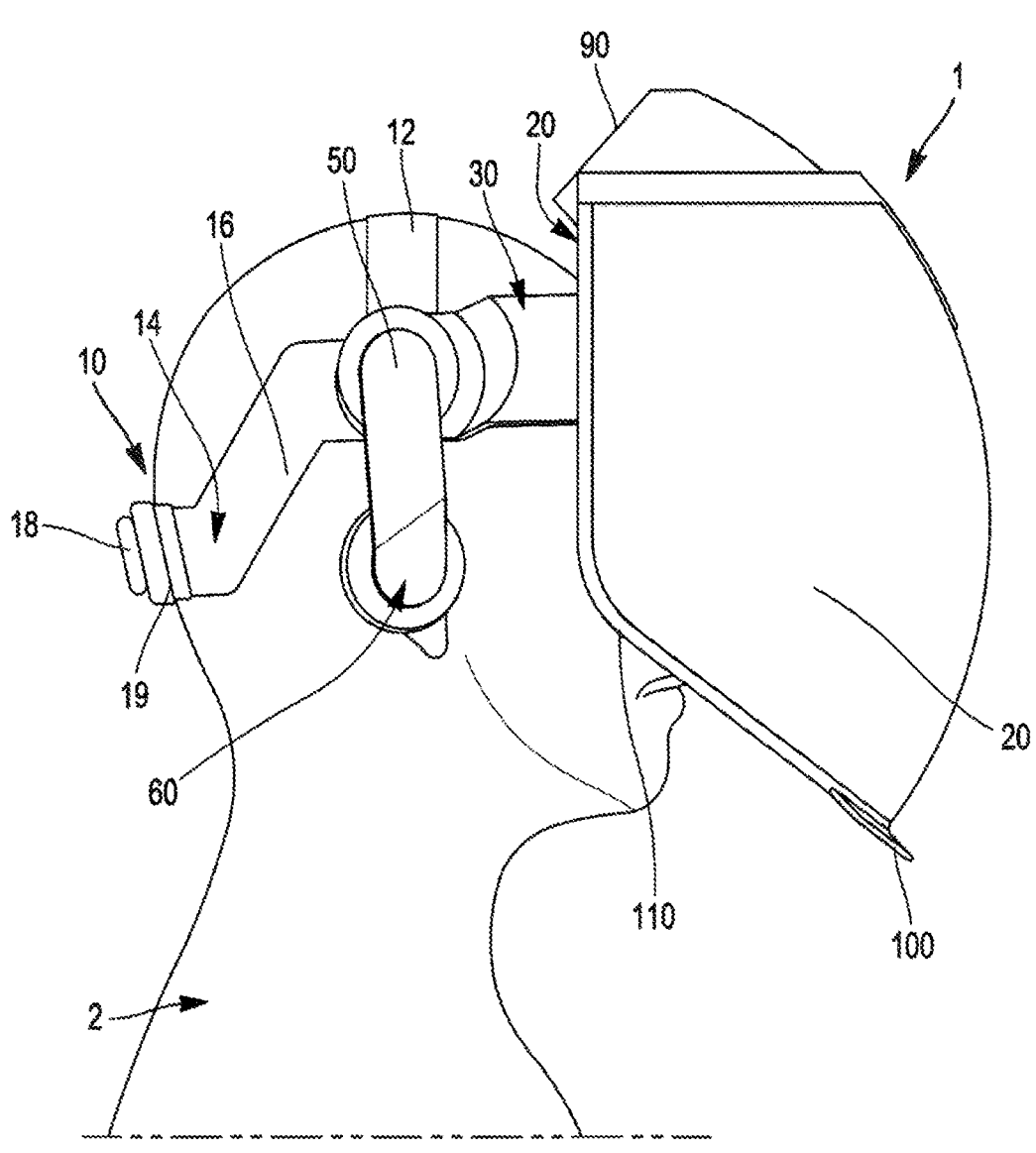

[Fig. 2]
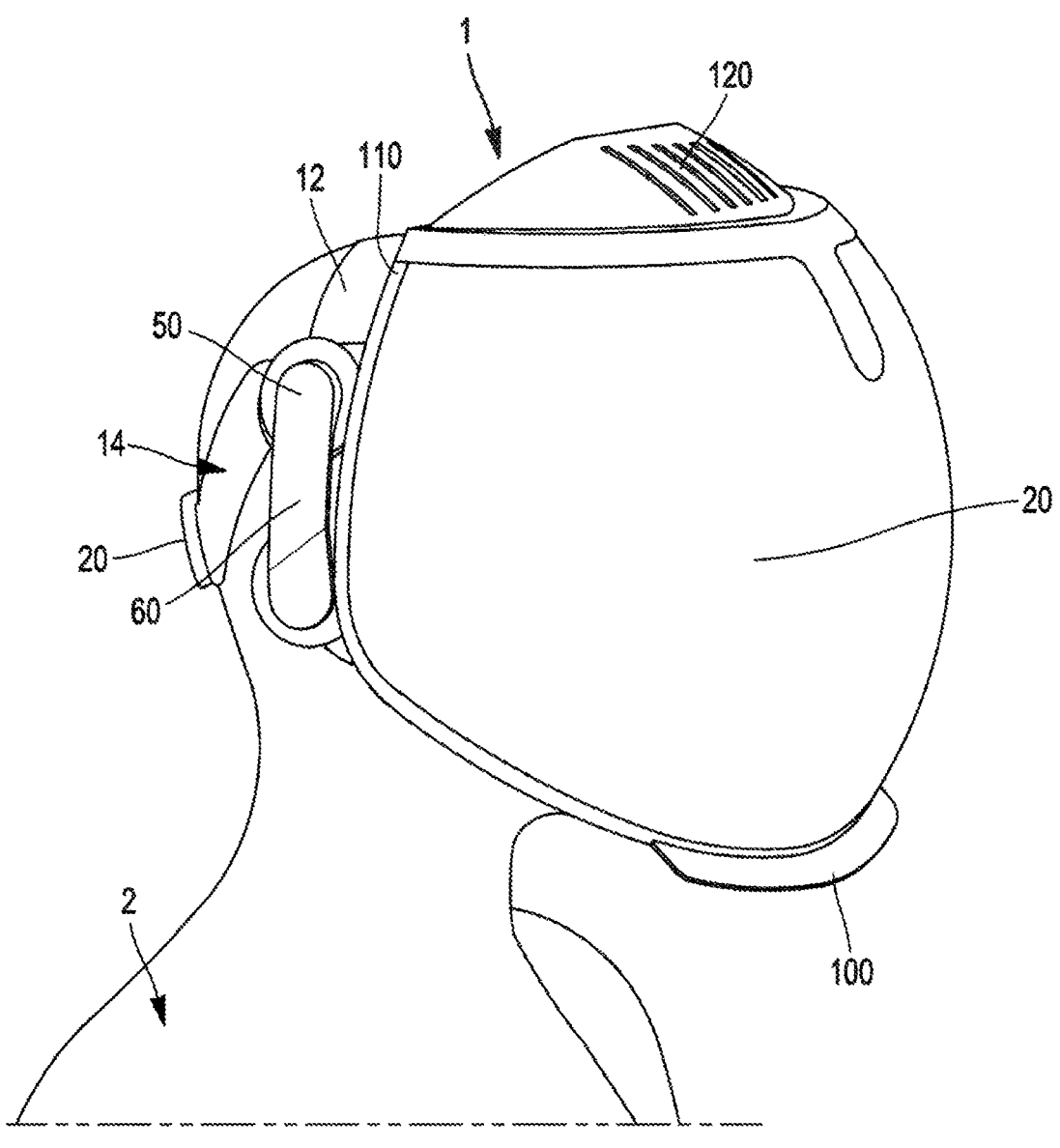

[Fig. 3]
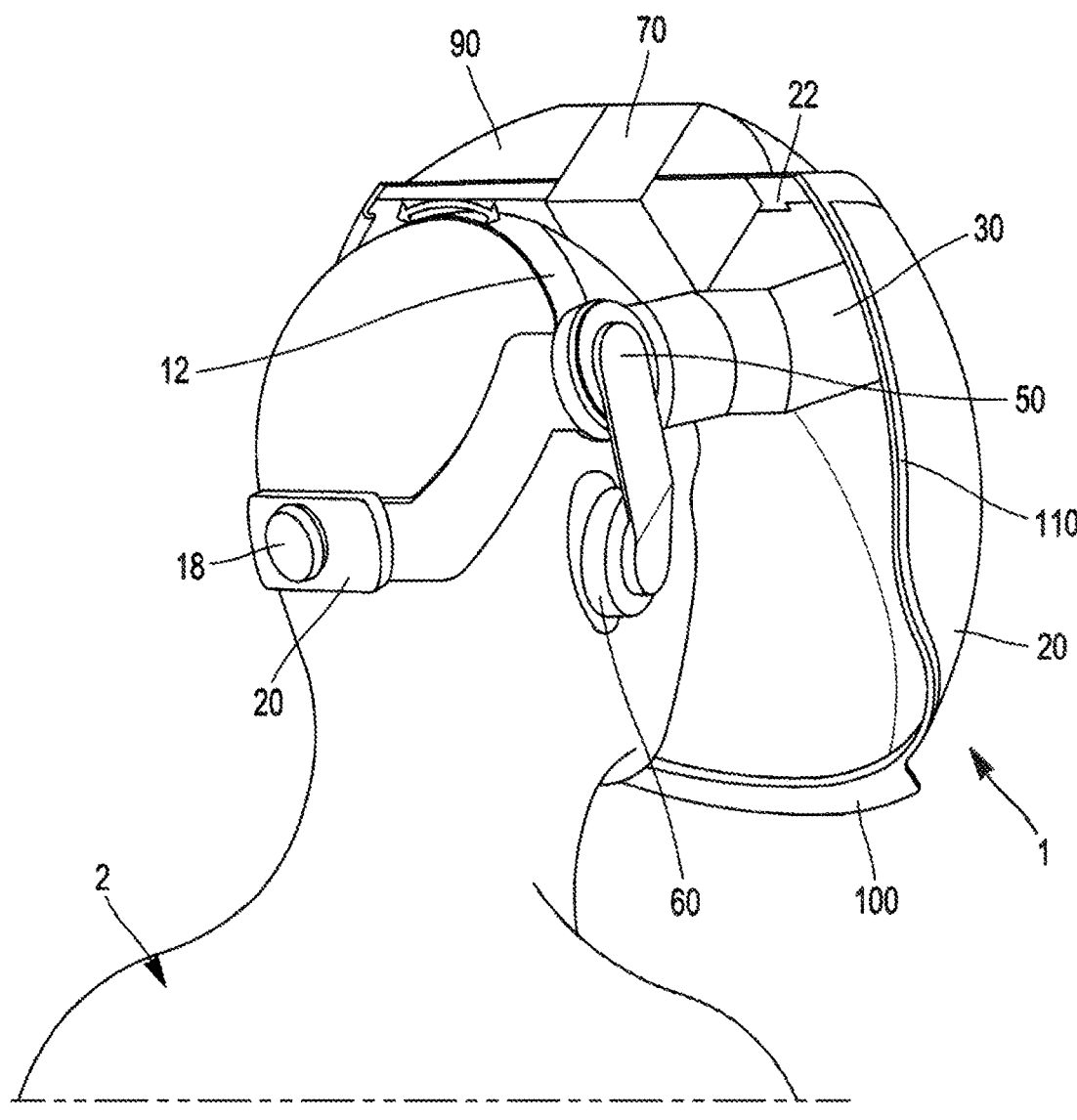

IMMERSIVE AUDIO-VISUAL HEADSET

FIELD OF THE INVENTION

The present invention relates to an immersive device.

TECHNOLOGICAL BACKGROUND

More specifically, the invention relates to an immersive audio-visual headset that can be used as a source of well-being and therapy.

In the field of virtual reality devices, glasses are known which offer an image to each eye and which are equipped with gyroscopic sensors to keep the orientation of an image despite the movements of the head. The fact that the image keeps the same orientation despite a tilt of the head gives a virtual reality effect.

The image sent to the right eye and the left eye may have been filmed from two slightly different viewing angles, reproducing the same distance between two human eyes. Thus, by projecting these two left/right images respectively in front of the user's left and right eyes, a three-dimensional depth effect is obtained.

In addition, the portion of the video image projected in the glasses is shifted according to the movement of the head detected by sensors when it turns to one side, the part displayed in front of the eye is shifted in proportion to the movement in the opposite direction.

With a vectorized 3D video image, it is possible to simulate movements with a projected image which will modify the relative arrangement of the elements which make up an image according to the detection of the user's movements thanks to sensors according to the rules of perspective in order to reproduce the changes of points of view, as in reality.

All these methods combined make it possible to generate a virtual reality for a user. Such glasses are known for example from US2017/323,485 or U.S. Pat. No. 10,657,718. Instead of glasses, visors covering the face or headsets providing a surface at a distance from the face forming a curved screen on which images can be projected are known. In such devices, the 3D effect is obtained thanks to a sufficient distance between the eye and the point of the screen closest to the eye, as specified in document WO2009066408A1. Such virtual reality headsets are mentioned in WO 2019/246,576 or WO 2020/088,102.

Indeed, the depth sense of the human visual sense has been found to be most affected by binocular parallax. In other words, different images between the two eyes are generated by the sight of a human being and the binocular parallax allows the perception of the sense of depth. But experience shows that a 2D image projected at a certain distance from the human eye, beyond 21.7 cm, on a curved screen, for example spherical, can be interpreted by a human brain as a 3D image.

The projected image may also vary depending on the position and movements of the user.

US 2020/139,077 rather seems to describe a tablet on which a virtual reality image is displayed.

There are also devices for recognizing emotions from the image of a face: the ten emotions of joy, tranquility, sadness, anger, fear, surprise, boredom, contempt, fatigue and disgust can be recognized. These are devices that are frequently used in the field of marketing and sales to the general public to provide a more personalized customer experience.

The invention aims to propose a device specially adapted to medical treatments which combines the two functions of virtual reality and emotion recognition by making it possible to adapt the stimulations provided in virtual reality in real time to the emotions expressed on the face of a user, while being the least invasive possible.

In order for said device to be used in the context of medical therapy, it is essential that it be the least invasive possible to prevent it from being a source of anxiety, stress and fatigue for the user.

Thus, the user's brain is stimulated in an appropriate way for as long as necessary during a day, thus helping to fight against boredom, sadness and fear and to delay the degeneration of cognitive functions of the brain of the user.

The therapeutic application targeted by the invention is that of neurodegenerative diseases, more specifically that of Alzheimer's disease, Parkinson's disease or related diseases.

SUMMARY OF THE INVENTION

Thus, the invention relates to an immersive device which comprises:

a fixing element for fixing the device on the head of a user, an emotion recognition system capable of detecting emotions of the user, the emotion recognition system comprising at least one sensor and a computer analyzing one or more signals from the sensor to indicate an emotion chosen from joy, tranquility, sadness, anger, fear, surprise, boredom, contempt, fatigue and disgust, a system for broadcasting video sequences, a video sequence comprising a series of broadcast images, the broadcasting system being adapted to select a video sequence classified with respect to at least one emotion of the user communicated by the computer of the detection system, and to broadcast it on a screen, an observation system for capturing, broadcasting and/or recording user reactions.

By immersive, we mean a device that allows the user to disconnect from their environment and give them the impression of being immersed in a different environment by appealing to their following senses: sight and hearing.

The used video sequence broadcasting system can be more or less sophisticated, and can comprise multiple sensors for determining the positions and movements of the user, in order to reproduce a virtual reality as a function of these positions and movements of the user. Alternatively, for the sake of limiting the weight and the cost of the device, the used video sequence broadcasting system can be a simple video sequence broadcaster without taking into account the movements or the position of the user at the time of broadcasting.

Videos may include sound broadcast in sync with the broadcast images. Broadcasting can be done by loudspeakers built into the device or external.

In the end, the best compromise, depending on the application, between weight and performance, is sought.

The videos broadcast can be of 3 categories:

Relaxation, pleasure, entertainment;

Reminiscence, attention, memory, reasoning, mastery of space;

Movement, interaction, motivation.

The video sequence broadcasting system is controlled by a computer program which selects the appropriate video according to certain criteria, such as the broadcasting frequency, the video rating, or a random choice. The selection is made from a list of video sequences stored in the form of computer video files gathered on a memory.

The video sequence broadcasting system is supplied with electricity by a source of electrical energy, for example external, via a wired connection.

By video, within the meaning of the invention, is meant a sequence of a series of broadcast images, for example of a few minutes at least, the content of which has been tested as adapted to one or more human emotions with the aim of generating joy, tranquility or to stimulate the cognitive functions and concentration of the user's brain.

The system for broadcasting video sequences according to a virtual reality method, well known to those skilled in the art, can integrate movement and position sensors of the user.

This information is used to adjust the broadcast video to simulate a three-dimensional outdoor scene. The video sequence distribution system can manage all types of video content, from a purely 2D recorded image to an image recorded and projected over 360°, corresponding to a solid angle of 4 times Pi steradians, or a succession of such images.

For example, medical personnel can monitor the user's ability to react to videos broadcast through the observation system. We then say that the observation system is adapted to broadcast the reactions of the user to the medical staff.

The immersive device which has just been presented is characterized in that it comprises a visor which serves as a screen, and extending from above the top of the forehead to the level facing the chin, and a link between the fixing element and the visor.

Depending on various aspects, it is possible to provide one and/or the other of the provisions below.

The emotion detection system translates and transmits in real time to the video broadcasting system the emotions detected, possibly weighted. Thus, the video broadcasting system can select a video to be broadcast according to the detected emotion or emotions.

Detectable emotions are one or a combination of the following emotions: joy, tranquility, sadness, anger, fear, surprise, boredom, contempt, fatigue and disgust. Each emotion can also be weighted according to an intensity criterion.

The detection system thus integrates the processing of the signal representative of the emotions of the user, well known to those skilled in the art, and communicates this information to the video distribution system in order to select a suitable video. Depending on the level of persistence of the emotion, a video already playing may be interrupted by the detection system. Otherwise, it is the emotion detected at the end of a video that is taken into account to choose the category of the next video to be broadcast.

The diffusion system records the list of emotions detected with a time stamp, as well as the intensity and duration of each emotion. This list is made available for analysis purposes to medical personnel.

Thanks to these provisions, a user, suffering for example from Alzheimer's disease, can be stimulated specifically according to his emotions by means of videos within the framework of a therapy developed by the attending physicians. Such stimuli are intended to solicit certain functions of the brain in order to delay or even avoid their degeneration.

According to one embodiment, the observation system comprises a camera, oriented towards the face of the user.

Thus, the visibility of the images broadcast for the user is not hindered.

According to one embodiment, the fixing element is adjustable.

Thus, the wearing of the device can be made more comfortable and compatible with all users.

According to one embodiment, the system for broadcasting video sequence further comprises a video projector.

So you can use a 2D source video and, provided you position the screen about 20 cm from the user's eyes, you get a 3D effect.

According to one embodiment, the video sequence broadcast system comprises a support making it possible to support the video projector in a reversible manner.

Thus, the invasive aspect specific to this type of device is limited. Hygiene is also improved by avoiding contact with the face.

Finally, it allows the change of the video broadcast system in the event of a breakdown, or of technological improvement at the level of the projector very simply.

According to one embodiment, the screen is part of a visor curved so as to be at a distance from the face in the position of use and to occupy the visual field of the user.

By thus limiting the points of contact between the device and the face of the user, the invasive aspect specific to this type of device is limited.

In terms of hygiene, this also reduces the risk of contamination by viruses and bacteria.

The device is thus suitable for physically and/or psychologically weak people.

According to one embodiment, the support adapted to a video projector is fixed on a part of said device intended to be above the head of the user in the position of use.

The heat emitted by the projector thus escapes above the head of the user. The center of gravity of the device is thus closer to the axis of the user's body in a standing or seated position. Thus, the invasive aspect specific to this type of device is limited.

According to one embodiment, the immersive device is equipped in its lower part with a flap.

According to one embodiment, the immersive device is a therapeutic or well-being device.

According to one embodiment, the device is adapted to disconnect the user from his environment and give him the impression of being immersed in a different environment by appealing to his senses: sight and hearing.

According to one embodiment, the video sequences each comprise a sequence of broadcast images whose content has been tested as adapted to one or more human emotions with the aim of generating joy, tranquility or to stimulate cognitive functions and concentration of the user's brain.

According to one embodiment, the immersive device has no point of contact with the face in the position of use.

According to one embodiment, the rigid link is flared outwards in the direction going from the fixing element towards the visor.

According to one embodiment, the visor has a peripheral periphery remote from the face of the user in the position of use.

According to another aspect, a system is provided comprising a control station and at least one or even several immersive devices.

This reinforces the solidity of the device and facilitates its handling.

According to one embodiment, the immersive device is used to provide well-being and/or as a therapeutic accompaniment or complement.

By "therapeutic", we mean a device that is used as a therapy or as an accompaniment to the implementation of a therapy. The therapeutic immersive device contributes to the well-being of a user undergoing therapy.

By "well-being", we mean a pleasant feeling.

BRIEF DESCRIPTION OF THE DRAWINGS

Embodiments of the invention will be described below with reference to the drawings, briefly described below:

FIG. 1 represents a profile view of a user equipped with a device for treating Alzheimer's disease according to one embodiment.

FIG. 2 represents a three-dimensional view from a lateral point of view facing a user equipped with a device for treating Alzheimer's disease according to the same embodiment.

FIG. 3 represents a three-dimensional view from a side and rear point of view of a user equipped with a device for treating Alzheimer's disease according to the same embodiment.

In the drawings, identical references designate identical or similar objects.

DETAILED DESCRIPTION

The detailed description presents an embodiment of the immersive device.

The immersive device 1 represented in the figures is in the position of use on a user 2.

This device has three main parts:

A fixing element 10, a visor 20, a link 30 between the fixing element 10 and the visor 20.

A fourth part 60, optional, covers the ears of the user and can broadcast the sound of a broadcast video. Another option is to use speakers.

The fixing element 10 is for example made of PVC. In the presented example, the fastening element forms a harness comprising a plurality of tight bands on the user's skull. It comprises two parts, as will be detailed below: The fixing element 10 comprises a first part 12 which is positioned on top of the user's skull. This first part comprises a straight strip 12, in PVC or fabric, adjustable in length in order to adjust the width and height of the immersive device 1. This adjustable straight strip 12 extends from an assembly point near one temple of the wearer to an assembly point near the opposite temple. These two points are assembly points 50 where the ends of the different parts 30, 60 of the immersive device 1 are fixed.

The right assembly point 50 is located near the right temple of the user 2. A left assembly point is located near the left temple of the user 2. As a variant, any type of suitable adjustment system could be used.

The fixing element 10 comprises a second part 14 which is positioned on the back of the head of the user 2. This second part 14 is made up of two rigid strips 16 connected by a clamping wheel 18 coupled to a mechanism 19 allowing a support grip on the part below the skull of the user 2. The support is lower than the two assembly points 50 thanks to the orientation of the two rigid strips 14 downwards when said device is in the position of use.

The clamping wheel 18 and the mechanism 19 connect the two rigid strips 16 and a manual rotational action is transformed by the clamping wheel 18 into a translational movement by the mechanism 19. By reversing the direction of rotation of the clamping wheel 18, the direction of the translational movement applied by the mechanism 19 on the two rigid strips 16 is reversed. Thus, the tightening of the second part 14 can be adjusted over the width and depth of the head of the user 2. Alternatively, any other suitable clamping device could be used.

On each of the left and right assembly points 50, the fourth part 60 comprises audio headphones placed to cover each ear of the user 2 when the immersive device 1 is in the position of use on the head of the user 2. The audio headphones are connected to the video broadcasting system and are capable of broadcasting the sound associated with a video.

From the two left and right symmetrical assembly points 50, a link 30 makes it possible to fix a visor 20 at a distance from the face of the user 2 when the immersive device 1 is in the position of use. The link 30 is for example made of PVC. As visible in FIGS. 1 and 3, the link 30 is oriented so as to deviate laterally from the median vertical plane of the user's head. Thus, the links 30 have a conical geometry widening from the head of the user 2 forwards. The visor 20 serves as a screen. The visor is for example made of polycarbonate. Thanks to polycarbonate, we obtain a visor with a very smooth surface, very resistant to shocks, and without any effect on health in the absence of contact with certain chemical agents, and which can be transparent or opaque, for example white. Thus, the visor is lighter and easier to manufacture than a spherical lens.

In the position of use, the visor 20 extends from above the top of the forehead to the level facing the chin of the user 2 to form a portion of a sphere globally equidistant from the face of the user 2, at approximately 20 cm for example. As visible in FIG. 1, the portion of the sphere, with an extent of less than half a sphere, extends towards the back of the head, to behind the vertical plane of the eyes. The visor 20 thus has a peripheral periphery which, in the position of use, is remote from the face of the user. The user's entire visual field is intercepted by the visor 20. However, the solid angle occupied by the visor 20 does not go beyond, or goes little beyond, the visual field of the user.

There may be, depending on the embodiment, and depending on the concerned part of the face, between 12 cm and 20 cm between the face of the user 2 and the visor 20. Thus, the immersive device 1 has no point of contact with the face in the position of use.

The visor 20 includes a video broadcast system. At the level of the visor 20 located facing the forehead, above the eyes of the user 2, a projector support 70 makes it possible to fix a projector. A projector is attached to the projector support 70. Thus, the video broadcast system comprises a projector. Therefore, the visor 20 also includes a projector. The projector is suitable for projecting an image onto the inner face 21 of the screen. In the embodiment represented, it is a LBS pico-projector ("Laser Beam Splitting") or DLP ("Digital Light Processing") to project an image, and in particular a succession of images forming a video. Each image has been processed by computer using an algorithm to correct certain display distortions.

The LBS pico-projector provides an image that is always sharp, even when projecting at an angle. However, it remains to correct the display distortions due to the curvature of the screen.

A tailor-made optic interacts with the light beam emitted by the LBS pico-projector to participate in the correction of the image in order to reproduce a clear and undistorted image of the original image on the curved surface, for example spherical, inside of the visor 20. By faithful image, we mean an image perceived by the user 2 as globally similar to the original recorded image. The video sequence broadcasting system comprises a memory or a system for accessing a memory, in which video sequences are stored.

These sequences have for example previously been classified to respond to one or more emotions. According to an exemplary embodiment, the video sequences are each associated with a rating from a prior evaluation. Additionally or alternatively, the video sequences may be associated with a broadcast history. A counter associated with a video can therefore be incremented with each new broadcast of the video. Broadcast history, can be associated with each given user. This last embodiment requires that, at the time of use of the immersive device, it includes a means of identifying the user. This identification can be entered manually, by biometric measurement or otherwise.

In addition to the video broadcasting system, an emotion recognition system makes it possible to detect the user's emotions in real time thanks to sensors connected to a computer capable of interpreting the signals received into an emotion, possibly weighted, or a plurality of weighted emotions. The detected emotions can for example be chosen from the following list: joy, tranquility, sadness, anger, fear, surprise, boredom, contempt, fatigue and disgust.

Thus, the emotion recognition system comprises, as an example of the sensors mentioned above, a camera 22, of the webcam type, positioned to film the face of the user 2. For example, the visor 20 includes this camera 22. This camera 22 is connected to the video sequence broadcasting system. The emotion recognition system analyzes and extracts a list of weighted emotions in real time based on the image captured by the camera 22.

Such systems can include other sensors, whether or not they are coupled together: sweating, temperature, electrodermal activity, pulse, pupil detection, etc.

If the weighting of one of the emotions exceeds a certain threshold, or if the video sequence being broadcast ends, the video distribution system selects a category of available video sequences according to the captured emotion.

To choose a video sequence from among those available in a category corresponding to the detected emotion or combination of emotions, several criteria can be used, alone or in combination: a random choice, the frequency with which the video sequence is broadcast, a video footage not yet released to this user, a very well rated video, etc.

Once the video has been selected in the category corresponding to the detected emotion or combination of emotions, it is broadcast by the projector on the inner face 21 of the visor 20 which serves as a screen, possibly accompanied by a recorded sound.

The video sequences follow one another. Pauses and/or a final stop can be automatically programmed in this sequence of video sequences.

In addition, the immersive device includes an observation system adapted to capture the reactions of the user. For the observation system, the same sensors or cameras can be used as those of the emotion recognition system, which saves material. The measured data can be saved for later analysis. The observation system can be adapted to broadcast the reactions of the user to a third party, in particular an observer wishing to know the reactions of the user to the immersive experience. This broadcast can for example be done by wired or wireless communication of information. The captured and recorded data (for example, the face of the filmed user) can be displayed on a control screen of the observer. Thus, he can act in case the observation of the user requires it.

Thus, according to an exemplary embodiment, one uses a system which comprises the immersive device 1 as presented above and a control station. The control station is accessible to an observer who thus accesses information relating to the use of the device. The control station can thus be used to display signals coming from the sensors of the immersive device 1, as well as the multimedia content broadcast, if necessary simultaneously. This data can be displayed in real time, simultaneously with the use, or later. The control station can also be used to select, or help select, a multimedia sequence to be broadcast. If necessary, the control station can be associated with several immersive devices 1 used by different users.

The power supply of said immersive device 1 can be done by an electric wire, not shown, connected to an external power supply. In order to lighten said immersive device 1 as much as possible, to benefit from a long autonomy and to avoid sudden interruptions harmful to therapy, an external wired power supply, not shown, is advantageous.

The immersive device 1 comprises a gripping system. The gripping system comprises for example two elements:

The top of the visor 20 has a flat gripping edge 90 aligned, on each side of the projector support 70, with the rear face of said support 70;

a protective and gripping flap 100 is fixed on the edge of the visor 20 opposite the chin of the user 2.

Thus, with both hands, an operator can position and remove the immersive device 1 easily.

A reinforcing strip 110 surrounds the visor 20 in order to protect said visor 20 from possible shocks during use or handling.

Openings 120 on the top of the visor 20, at the level where the projector is positioned, make it possible to evacuate the heat generated by the operation of the projector.

The invention is not limited to the embodiments presented and other embodiments will appear clearly to those skilled in the art.

In particular in the case of a larger projector, the projector support 70 can be placed outside the visor, above the head, inclined towards the visor, and the projector can be positioned on said projector support 70 so as to direct the flow on the internal face of the visor. Thus, there is enough space to place larger projectors.

The projector and the passive screen can be replaced by an active screen made up of LEDs.

The PVC and/or polycarbonate used in the embodiment presented can be replaced by innovative materials on which bacteria and viruses have difficulty clinging.

The opacity of the visor can also be controlled by the video distribution system in order to alternate projections of video sequences and visual access to the external environment. Thus, at the end of a therapy session carried out using said device, the user has access to a vision of external reality without having to wait for the immersive device 1 to be removed from him.

To quickly access a vision of external reality, another technically simpler embodiment comprises a visor 20 provided with a reversible attachment system allowing the user to manually remove the visor 20 easily from the immersive device 1. A reversible attachment system is provided, in particular between the visor 20 and the link 30.

The immersive device 1 can also include a microphone adapted to pick up the sounds emitted by the user. These sounds can be recorded and transmitted to the control station. The control station may include a microphone adapted to pick up the sounds emitted by the observer, and to transmit these sounds to the immersive device. Thus, for example, a dialogue can be engaged, if necessary, between the user and the observer.

By providing an immersive device comprising a visor occupying a portion of the sphere intercepting the gaze of the user, and spaced from the face, and a mounting harness on the head, the immersive device is made as little invasive as possible to prevent it from being a source of anxiety, stress or fatigue for the user. Indeed, no mechanical stress is applied to the face. The system is compatible for users wearing glasses. The space between the face and the device can thus be used wisely to install equipment, for example one or more cameras that can film the patient's face. The ambient light likely to enter between the face and the peripheral edge of the visor provides a sufficient degree of brightness to film the face. This space also allows the circulation of an air flow for the ventilation of the user. Finally, from the point of view of hygiene, the visor is little or not contaminated by the user, and can then be quickly used for another user, subject, if necessary, to the interme- diate replacement of the element of fixation.

The invention claimed is:

1. An Immersive well-being device, wherein the immer-sive well-being device comprises:

a fixing element forming a harness for fixing the device on the head of a user, a visor which serves as a passive screen, and extending from above the top of the forehead to the level facing the chin, and curved so as to be at a distance from the face in the position of use and to occupy the visual field of the user, a link between the fixing element and the visor and flaring outward in a direction going from the fixing element toward the visor, an emotion recognition system capable of detecting emo- tions of the user, the emotion recognition system com- prising at least one sensor and a computer analyzing one or more signals from the sensor to indicate an emotion chosen from joy, tranquility, sadness, anger, fear, surprise, boredom, contempt, fatigue and disgust, a system for broadcasting video sequences each compris- ing a respective series of broadcast images, the broad- casting system being adapted to select a video sequence classified with respect to at least one emotion of the user communicated by the computer of the detection system, the content of which has been tested as adapted to one or more human emotions with the aim of generating joy, tranquility or to stimulate the cognitive functions and concentration of the user's brain, and comprising a video projector fixed above the head of the user in the position of use to broadcast the video sequence on the passive screen, whereby the device is adapted to disconnect the user from the user's envi- ronment and give the user the impression of being immersed in a different environment by appealing to the user's sense of sight, and an observation system for capturing, broadcasting and/or recording the reactions of the user.

2. The Immersive well-being device according to claim 1, in which the observation system comprises a camera, ori- ented towards the face of the user.

3. The Immersive well-being device according to claim 1, in which the fixing element is adjustable.

4. The Immersive well-being device according to claim 1, in which the system for broadcasting video sequences com- prises a support making it possible to support the video projector in a reversible manner.

5. The Immersive well-being device according to claim 1, in which the said device is equipped in its lower part with a flap.

6. The Immersive well-being device according to claim 1, wherein the immersive well-being device is a therapeutic or wellness device.

7. The Immersive well-being device according to claim 1, in which the video sequences each comprise a series of broadcast images, of a few minutes at least, the content of which has been tested as adapted to one or more human emotions with the aim of generating joy, tranquility or to stimulate the cognitive functions and concentration of the user's brain.

8. The Immersive well-being device according to claim 1, in which the immersive well-being device has no point of contact with the face in the position of use.

9. The Immersive well-being device according to claim 1, in which the visor has a peripheral periphery remote from the face of the user in the position of use.

10. A System comprising a control station and at least one immersive well-being devices according to claim 1.

11. A method of Use of the immersive well-being device according to claim 1, to provide well-being and/or as a therapeutic accompaniment or supplement.

12. A System comprising a control station and several immersive well-being devices each according to claim 1.

13. The Immersive well-being device according to claim 2, wherein the at least one sensor includes the camera.

* * * * *